(12) United States Patent
Doran

(10) Patent No.: US 9,476,805 B2
(45) Date of Patent: Oct. 25, 2016

(54) SYSTEMS AND METHODS FOR BACKFLOW PREVENTER TESTING MANAGEMENT

(71) Applicant: David Doran, Westerville, OH (US)

(72) Inventor: David Doran, Westerville, OH (US)

( * ) Notice: Subject to any disclaimer, the term of this patent is extended or adjusted under 35 U.S.C. 154(b) by 303 days.

(21) Appl. No.: 14/322,833

(22) Filed: Jul. 2, 2014

(65) Prior Publication Data

US 2015/0013450 A1    Jan. 15, 2015

Related U.S. Application Data

(60) Provisional application No. 61/842,428, filed on Jul. 3, 2013.

(51) Int. Cl.
*G05B 19/00* (2006.01)
*G01M 99/00* (2011.01)
*F17D 5/00* (2006.01)

(52) U.S. Cl.
CPC .............. *G01M 99/008* (2013.01); *F17D 5/00* (2013.01)

(58) Field of Classification Search
CPC ........ G01D 3/0365; G01D 5/24; F17D 5/00; G01M 99/008
See application file for complete search history.

(56) References Cited

U.S. PATENT DOCUMENTS

| | | | |
|---|---|---|---|
| 5,257,208 A | 10/1993 | Brown et al. | |
| 5,713,240 A | 2/1998 | Engelmann | |
| 6,675,110 B2 | 1/2004 | Engelmann | |
| 2009/0157521 A1* | 6/2009 | Moren | G06Q 10/10 705/1.1 |
| 2012/0030250 A1* | 2/2012 | Eisenhauer | G06Q 50/06 707/803 |
| 2013/0310992 A1* | 11/2013 | Larsen | A01G 25/16 700/284 |

* cited by examiner

*Primary Examiner* — Kerri McNally
*Assistant Examiner* — Renee Dorsey
(74) *Attorney, Agent, or Firm* — Hahn Loeser & Parks, LLP

(57) ABSTRACT

Systems and methods are described for performing, verifying, and managing testing of backflow preventers. A method can include aspects directed toward confirming proper performance of tests on a backflow preventer by interrogating an inspector's location and credentials before producing test results. Systems are described to perform aspects of such methods. Further, a mobile device is provided for use by an inspector, the mobile device being directed toward confirming proper performance of tests on a backflow preventer. Aspects can also relate to the management of data related to the tests and backflow preventers.

20 Claims, 9 Drawing Sheets

SYSTEMS AND METHODS FOR BACKFLOW PREVENTER TESTING MANAGEMENT

CROSS-REFERENCE TO RELATED APPLICATIONS

This application claims priority to and the benefit of U.S. Provisional Patent Application 61/842,428 filed Jul. 3, 2013, which is incorporated by reference in its entirety.

FIELD OF THE INVENTION

This invention generally relates to the testing of building equipment. More particularly, this invention relates to the administration and management of backflow preventer testing.

BACKGROUND

Buildings and infrastructure can include a variety of devices or equipment requiring regular inspection. In some areas, including those where resources such as water, electricity, gas, and others are shared, various devices related to utilities or shared resources can be subject to regulatory oversight of the inspections.

In an example, buildings or devices connected to a water utility can be equipped with backflow preventers. A backflow preventer is a device that precludes water that has entered a private system from comingling with water "upstream" of the preventer. Pressure drops in a water system, or even periods without fluid movement, present a risk of water (or other fluid) that has been moved "downstream" in a system flowing backward. Through use of backflow preventers, fluid that has been potentially exposed to contaminants or pollutants is prevented from re-entering pipes or other conduits where it may be passed to non-contaminated areas.

To ensure the integrity of shared water sources such as mains, both purveyors and consumers share an interest in properly functioning backflow preventers. This interest has been adopted by various governments or administrative bodies in the form of regulations requiring installation and periodic inspection of backflow preventers (and other devices or services). This has led to huge numbers of required inspections. With so many inspections required and limited resources to oversee compliance, error and fraud can arise. Further, the data gathered through inspections may become difficult to monitor and manage, at times causing incomplete records or record discrepancies.

Such challenges are not limited exclusively to backflow preventers. Similar conditions exist for a variety of devices and technologies subject to managed inspection or service. For example, related devices such as fire protection (e.g., sprinklers), plumbing components, irrigation systems, and others can be maintained and inspected according to regulation. Further, devices unrelated to utilities can be regulated, tracked, and managed in similar ways, and solutions related to backflow preventers can be extended to other technologies.

SUMMARY

In embodiments, this innovation generally relates to a method for testing a backflow preventer. The method can include aspects of authenticating a tester to produce a tester authentication result, identifying the backflow preventer using unique backflow preventer identifier, and recording at least results of testing of the backflow preventer. The method can also include at least communicating at least the results to a server based at least in part on one or more of the tester authentication result and the unique backflow preventer identifier.

In additional aspects, the innovation can further relate to a system for testing a backflow preventer. The system can comprise a backflow preventer authentication module that identifies the backflow preventer according to a backflow identifier, and an inspector authentication module that identifies the inspector according to at least a inspector identifier. The system can further include a testing module that receives at least a portion of test results of one or more tests performed on the backflow preventer based at least in part on one or more of the backflow identifier and the inspector identifier, and a communications module that transmits the test results to a backflow compliance server.

In still other aspects, the innovation can relate to a mobile device for testing a backflow preventer. The mobile device can comprise a backflow preventer recognition component configured to recognize a backflow preventer according to a backflow preventer identifier, an operator recognition component configured to recognize an operator of the device according to one or more operator criteria, a test result component configured to receive at least one test result related to the backflow preventer, and a network component configured to communicate the at least one test result, the one or more operator criteria, and the backflow preventer identifier.

Various aspects will be apparent to those skilled in the art from the following detailed description and the accompanying drawings.

DETAILED DESCRIPTION

Figure 1:
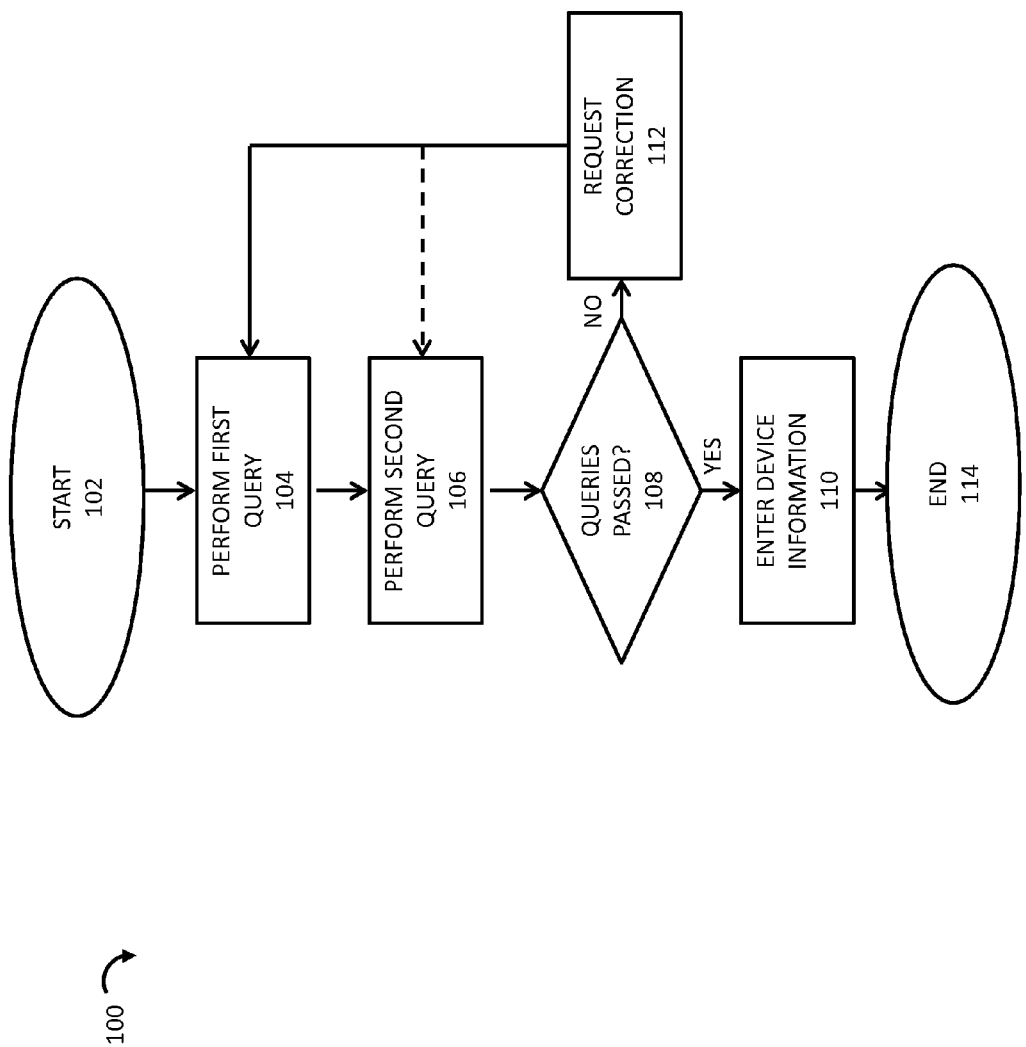
FIG. 1 illustrates an example methodology for validating test results from a backflow preventer testing device with a multi-factor test.

Error and fraud in backflow preventer testing can be attributed to a variety of causes, such as improper performance of tests, improper or unserviceable testing equipment, improper testing parameters, non-licensed inspectors, improper identification of a backflow preventer (e.g., either the model, or the actual preventer, such as where multiple preventers are co-located), forged or copied test results, skipped tests, and so forth.

Error and fraud can be mitigated by various oversight techniques. Regulating purveyors, licensing inspectors, requiring the carriage of bonds and insurance, and imposing penalties (e.g., water shut-off, fines, revocation of permits) can encourage compliance and reduce such undesirable outcomes. Detailed identification and tracking of individual devices and inspectors will ensure business benefits and punitive measures will attach to the appropriate actor. In embodiments, multi-factor validation related to individuals, organizations, or devices can be used to avoid or discourage erroneous or fraudulent testing. However, while careful administration can reduce the incidence of error and fraud, the number of parties and volume of information involved can invoke particular organization of information and scheduling problems.

A number of techniques exist for the administration of current backflow testing. For example, paper-copy test results can be generated and maintained in various manners. However, at least a portion of this information can be sent, received, and delivered online. By using a web- or network-based management solution, all necessary data points can be gathered in standard formats and stored in a searchable, reportable database(s) after information has been validated for entry.

As used herein, a backflow preventer, backflow preventer device, or similarly-termed component is a device that prevents fluid from moving in at least one direction at the location of the backflow preventer. For example, a backflow preventer can be a device placed between two portions of a single pipeline that allows water to flow through in one direction, but not pass back through the other. In alternative or complementary embodiments, backflow preventers can be located at or near junctures where multiple pipelines join or split. Such locations can be referred to as "cross-connections." Multiple backflow preventers can be employed in a single path, and multiple backflow preventers can be substantially co-located where pipelines diverge (e.g., to provide water service to different tenants within a building) without departing from the scope or spirit of the invention. Backflow preventers can include, but are not limited to, air gaps (AG), reduced pressure principle (RP) backflow preventers, dual- or double-check valve (DC) assemblies, residential dual-check valves (RDC), atmospheric vacuum breakers (AVB), pressure vacuum breakers (PVB), and spill-proof pressure vacuum breakers (SVB).

As used herein, a backflow preventer testing apparatus, backflow preventer testing device, or similarly-termed component refers to a device or group of devices configured to perform at least a portion of a test related to the function of a backflow preventer. In various embodiments, a backflow preventer tester apparatus can perform functions directed toward proper identification of one or more backflow preventers, inspectors, locations, and other information not directly produced through literal testing of the backflow preventer (e.g., testing a valve performed by a different component than is used to validate occurrence of testing itself, identification of individual backflow preventer not completed by valve testing device).

As used herein, "upstream" and "downstream" generally refer to entities, devices, or points closer or farther from the source of water. For example, the customer is downstream from the purveyor, and the backflow preventer closest to the customer is downstream of the water main.

Various entities are involved in backflow preventer testing. A customer or consumer is an entity downstream of a backflow preventer. The customer or consumer can be the end-user of water (or another resource associated with a backflow prevention or other device). It is understood that the customer or consumer may refer not to a particular person, but can include a building, unit within a building, groups thereof, or other branches of a supply downstream of at least a pertinent backflow preventer. While aspects herein are directed toward arrangements where the customer is a participant in backflow prevention, it is understood that the purveyor may take the position of the customer in some embodiments by assuming responsibility for one or more backflow preventers related to the customer (e.g., purveyor responsible for one or more of installation, inspection, service, removal, replacement).

The purveyor is the customer's supplier, such as the water company. Purveyors can be public organizations, private businesses, or combinations of one or both working in concert. While the purveyor has a variety of interactions with the customer, one such organization is turning on or shutting off access to water supply. The purveyor may, according to either an administrative entity or by action of contract, be responsible for at least one aspect of backflow preventer monitoring and maintenance.

An administrative entity (or similarly-termed group) is a government, agency, city, municipality, regulatory body, professional or civic organization, et cetera, authorized to promulgate regulations, requirements or standards related to backflow preventers (or other devices herein) and testing requirements for the same. Administrative entities may publish details about such devices, their maintenance, and testing, and may also license individuals permitted to perform inspections or service to such devices. Examples of a hierarchy of administrative entities includes the U.S. Environmental Protection Agency, which develops rules implemented by state governments, whose regulations are supplemented by additional municipal policies.

An inspector, technician, or similarly-termed party is a party who performs at least one of installation, testing, service, replacement, or similar activity related to a backflow preventer. Inspectors may be required to comply with various regulations and licensing arrangements. As used herein, "tester" may be used interchangeably or simultaneously to refer to a relevant backflow preventer testing device or person using the backflow preventer testing device.

As used herein, regulations are protocols, provided by the administrative entity, discussing proper device selection, installation, and inspection procedures. Likewise, licensing procedures are defined by an administrative entity, but apply specifically to the inspector. Regulations and/or licensing procedures may be territorial. There can be multiple relevant administrative entities related to any one customer, purveyor and/or inspector. The various administrative entities can provide multiple different controls related to backflow preventers or other devices. For example, a state administrative entity may promulgate a first set of backflow preventer regulations and license backflow preventer technicians within the state, while a municipality provides additional backflow preventer regulations and require each state-licensed inspector to acquire an annual permit. In another state, there may be no state regulation, but each county or city may have its own distinct backflow preventer regulatory architecture.

An example regulation can define a particular backflow preventer or type of backflow preventer in view of various factors. For example, particular environments may benefit from continuous pressure as compared to non-continuous pressure. Other factors can include (but are not limited to) backpressure/back-siphonage, flow rate, velocity, elevation, pressure loss, characteristics of the fluid, laminar or turbulent flow, and other quantities relating to fluids or piping.

As used herein, a backflow preventer inspection network service or similarly-termed service includes at least one device accessible by network configured to receive and store information about backflow preventer inspections or other service. Other aspects, variants, and/or alternatives will be apparent in view of details provided herein. A backflow compliance server is at least a server containing a database including backflow compliance information (e.g., information related to inspections according to regulation) that can be leveraged by a backflow preventer inspection network service.

Referring now to the drawings, there is illustrated in FIG. 1 an example methodology 100 for validating test results from a backflow preventer testing device with a multi-factor test. By using multiple distinct queries before finalizing backflow preventer testing results, the confidence in backflow preventer testing and test results can be increased.

At 102, methodology 100 starts and proceeds to 104 where a first query is performed. Methodology 100 proceeds to 106 where a second query is performed. Both the first query and second query are directed toward increasing confidence in backflow preventer information, including (but not limited to) test results.

Queries 104 and 106 can include various portions of automatically-detected and manually-entered information. For example, query 104 can include identification of a backflow preventer through detection of a radio frequency identifier (RFID) tag on the backflow preventer. RFID data may be detected and read without inspector interaction based on the proximity of the inspector and/or a backflow preventer testing device to the backflow preventer. In the same example, query 106 can include a biometric or physical input (e.g., fingerprint scanner, retina scanner, voice recognition and others) that allows the inspector to present an identifying characteristic to identify the inspector to the device to validate device activity. The identifying characteristic, or other information used to identify an inspector elsewhere herein, can be referred to as an inspector identifier.

Queries 104 and 106 can be based on based data. Location-based data can be automatically sensed, such as by global positioning system (GPS), cellular triangulation, Wi-Fi-based positioning, hybrid location-finding techniques, or other methods. Using the location of one or more devices associated with an inspector, an inspector location can be determined for the method or associated systems. Alternatively, location-based data can be retrieved from a database, such as the location of a particular identified backflow preventer, or a backflow preventer expected based on inspection scheduling. The location itself can be a query. In alternative or complementary embodiments, the location is a precursor or used as a variable in a query only partially resolved through location. For example, where query 104 is a location, query 106 or a subsequent query can evaluate the location to confirm the inspector is licensed or otherwise authorized to conduct backflow preventer inspections in the area, and/or confirm an inspection is performed in accordance with all applicable regulations.

In alternative or complementary embodiments, at least one of queries 104, 106, or others can depend on anticipated inspections or other scheduled activities. For example, a first query can be performed in advance of an inspection for later performance. In at least one embodiment, a backflow testing device can perform at least an identification of an inspector using the device prior to entering a functional mode. In alternative or complementary embodiments, the backflow preventer testing apparatus can perform a self-test (e.g., periodically, after loss of power, after large change in location, after being dropped, after a number of tests) as a query requiring confirmation.

In embodiments, at least one of queries 104, 106, or others can include requisitioning an inspection code. For example, a backflow preventer inspection network service can receive and/or issue an inspection code for a specific inspection (e.g., occurrence of backflow preventer testing). The inspection code can expire, through its use (e.g., entered and accepted for testing of one or more backflow preventers), the passing of an inspection window (e.g., expires 24 hours after inspection scheduled or due), or revocation by another user of the backflow preventer inspection network service (e.g., customer cancels inspection, administrator suspends license, and others). Such inspection codes provide an additional layer of control to ensure the proper inspector performs the appropriate test on the desired backflow preventer.

In embodiments, the queries at 104 and 106 can be performed simultaneously, in different orders, or include multiple sub-queries. Further, one or more queries of methodology 100 can be dependent on another query, such as when a password is only prompted after a backflow preventer that is scheduled to be inspected is identified. In another example, at least one query result can be evaluated at 108 before a subsequent query is enabled, such as when a backflow preventer may only be identified after the inspector is determined to be within a defined distance of the backflow preventer (e.g., by GPS, cellular triangulation, and/or other location means available).

At 108, a determination is made as to whether the information received in the first and second queries at 104 and 106 accords with known information. Data from at least the first and second queries at 104 and 106 can be processed locally (e.g., at the backflow preventer testing apparatus or using another device associated with the inspector) or transmitted for remote interrogation. In embodiments, a portion of the query data is evaluated locally (e.g., local device password) and a portion of the query data is transmitted for remote evaluation.

With regard to any portions of the query data transmitted for remote processing, query information can be sent to a backflow preventer inspection network service that retains identifying and authenticating information related to at least backflow preventers and inspectors. For example, a unique identifier (UID) coded onto a barcode attached to the backflow preventer can be stored in a remote database. When the inspector scans the barcode, the backflow preventer testing apparatus can transmit the UID to the service. The service can confirm records of the particular backflow preventer in the remote database to confirm the proper backflow preventer is identified before test results or other information are committed to a backflow preventer record.

If one or more query responses does not accord with at least one acceptable response at 108, methodology 100 can proceed to 112. At 112, methodology 100 can request a correction and recycle to repeat at least one of the queries at 104 and 106 to allow another attempt to provide an acceptable query response related to a backflow preventer. For example, identifying an individual backflow preventer can be one of the queries. If a backflow preventer that is not among a group of devices that the inspector is authorized to service, a component performing at least a portion of methodology 100 can request that the inspector re-identify the device or identify a different device. Alternatively, the component performing at least a portion of methodology 100 may request that the inspector re-identify to change credentials and authorize testing of the identified device. In embodiments, two or more repeated queries can be conducted in response to a query failure at 108. Various embodiments can permit the number of repeated queries to depend upon or be independent of the number of queries that do not pass at 108.

In still further embodiments, methodology 100 ends at 114 if one or more queries is not passed. For example, if an inspector fingerprint provided does not pass a query comparing the provided fingerprint to a stored fingerprint, this may be a result of a poor quality input from the fingerprint reader. Thus, it may be desirable to allow a new reading to be taken. However, if the stored fingerprint is matched, but the identified inspector does not have authority to perform an inspection in a location or on a particular backflow preventer, methodology 100 may proceed to 114 where it ends, at least temporarily locking out an unauthorized inspector.

In complementary aspects, query failures can be logged and stored. For example, at least one of a time, date, location, and reason for query failure can be entered into a backflow preventer inspection network service in lieu of or with device information at 110 or at another portion of methodology 100. In this fashion, possible errors, fraud attempts, and technical difficulties can be identified and/or monitored.

Passing of queries 104 and 106 at 108 can confirm and/or validate data related to be entered. For example, installation, testing, service, or removal of backflow preventers can be tracked in a database. However, in order to avoid errors or fraudulent entries, queries can be passed (e.g., at 108) to validate the data related to the queries or additional data. For example, a backflow preventer test can provide qualitative and/or quantitative results. However, in order to ensure the proper preventer was tested by an authorized inspector in accordance with regulations at a specified time, various queries can be employed prior to submitting or storing the test results. This also facilitates maintenance of a backflow preventer inspection and service history. Further data can include information or statistics on various entities (e.g., customers, purveyors, administrators, and/or inspectors) to identify trends or otherwise improve management of backflow preventer administration.

If the queries are passed at 108, methodology 100 can proceed to 110, and device information can be entered. Entry of device information can include local or remote storage in a database or memory location for validated device information associated with queries being passed. Alternatively, existing data can be modified or appended to indicate it is no longer provisional data but validated data. Various data can be gathered at one or more steps of methodology 100, and, in embodiments, at least a portion of data can be collected first and validated thereafter. In alternative or complementary embodiments, a portion of data related to queries is stored, and any information (e.g., device information accepted at 110) validated by one or more queries is collected after validation is complete and stored as validated from its creation or modification. In embodiments, data is stored locally, but not accepted at a remote location (e.g., backflow preventer inspection network service) prior to validation of the data. After the data is entered into at least one or more central backflow preventer inspection network services, methodology 100 ends at 114.

While examples of various queries have been provided with respect to FIG. 1, it will be understood that such queries can be directed toward at least any data point described herein. For example, queries can relate to information regarding any entity herein (e.g., customer, purveyor, administrator, inspector), interactions between the entities, one or more backflow preventers, one or more backflow preventer testing apparatuses, other devices, backflow preventer testing techniques, regulations related to backflow preventers or backflow preventer testing, financial information (e.g., invoices, electronic payment data), location (e.g., physical locations, information related to locations such as regulations related to one or more locations), interfaces or metadata, contracts, calendars or schedules, and others.

In embodiments, various portions of information collected, verified, or stored in methodology 100 can be accessed by or reported to the parties related to a backflow preventer. For example, the verification, testing, results, and ultimate compliance or noncompliance can be reported to an administrative entity to facilitate enforcement of backflow preventer regulations. This information can also be provided to customers to encourage compliance and interaction with purveyors, and to purveyors to encourage compliance and indicate when water should be turned on or shut off. Further, the information can be provided to inspectors to indicate backflow preventers that have been completed and those for which inspections are due or coming due.

The various parties can possess read and/or write privileges related to one or more portions of the data. For example, in embodiments, only an administrative entity can overwrite information in a record related to a backflow preventer or customer and multiple associated backflow preventers. A customer may only be permitted to view a portion of information about their backflow preventers (e.g., 2-year history) and not view any information regarding other customers' backflow preventers.

Various statistics can be aggregated and compiled based on information received, entered or stored in methodology 100 or using other systems and methods herein. For example, customers with water supplies shut off for inspection noncompliance can be flagged to purveyors. Further, inspectors who frequently provide information that fails queries can be indicated to the administrative entity for review of their licensure. In alternative or complementary embodiments, most-compliant customers or purveyors can be identified (e.g., least incidence of missed inspections, inspections completed with most lead time), and best inspectors (e.g., most inspections per day, fewest errors or failed attempts) can also become known. In addition to yielding information related to parties involved, this can also be used to identify systemic strengths or weaknesses (e.g., not enough inspectors in a region, frequent failure of approved backflow preventers in an area indicating characteristics of water utility).

Figure 2:
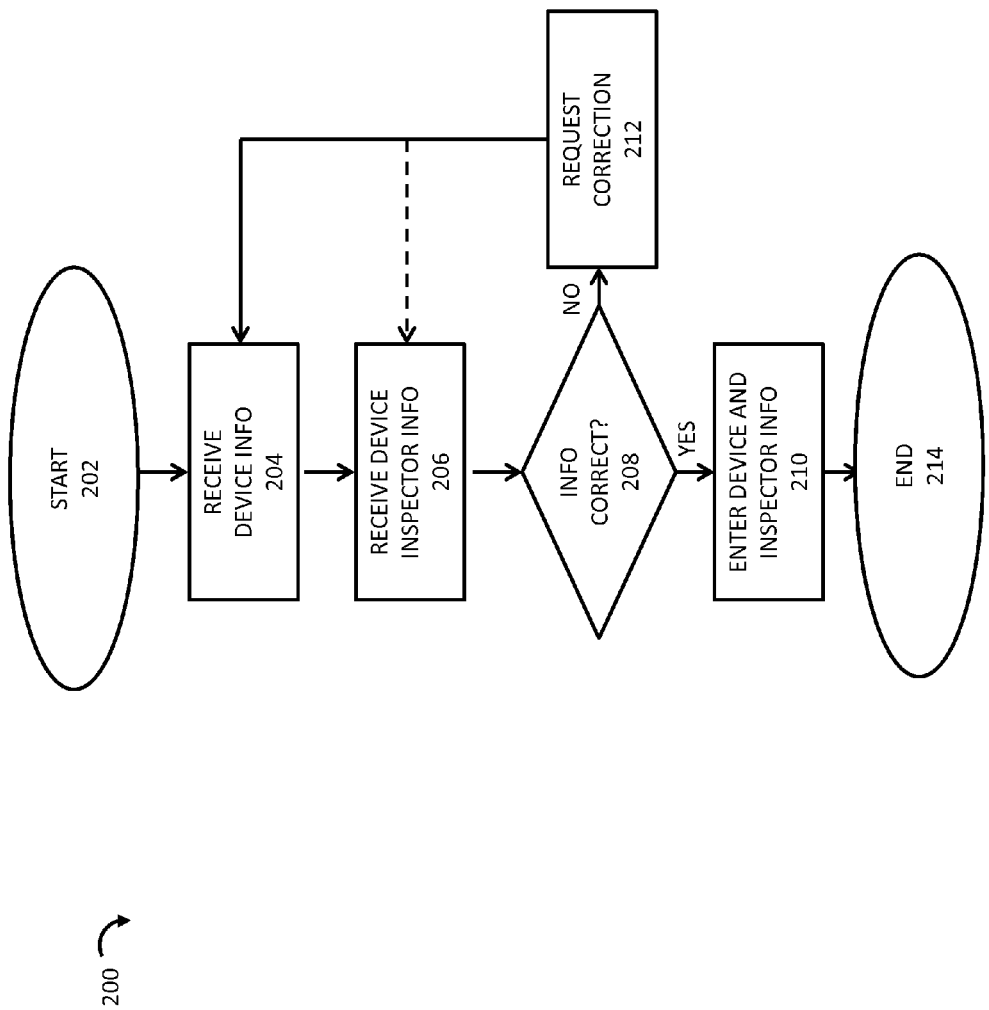
FIG. 2 illustrates an example methodology for confirming information about a device and confirming information about a backflow preventer inspector.

Turning now to FIG. 2, illustrated is an example methodology 200 for confirming information about a device and confirming information about a backflow preventer inspector. By confirming information about at least one device related to a backflow preventer, and interrogating information related to a specific inspector of the backflow preventer, accuracy and accountability can be increased to combat error and fraud in backflow prevention inspection administration and records.

At 202, methodology 200 begins and proceeds to 204 where device information is received. The device can be one or more backflow preventers. This ensures that a backflow preventer being inspected or serviced is, in fact, the appropriate backflow preventer, and avoids error or fraud while validating that only information related to that backflow preventer is associated with its record in the database.

In alternative embodiments, the device may be one or more backflow preventer testing apparatuses or other devices. Such aspects can also be complementary where additional steps (not pictured) receive additional device information.

Reception of device information can be automatic (e.g., automatically read RFID chip in range), partially automatic (e.g., automatically detect RFID chip but prompt to read chip information, read barcode when triggered and automatically update with information from barcode), or manual (e.g., manually enter serial number).

Embodiments herein embrace received device information to include at least a unique identifier (e.g., serial number, code on RFID tag, information in barcode, information in a quick response code, and others). The device information can be leveraged to confirm the "identity" of a specific device (e.g., backflow preventer) at one or more of an inspector, a testing apparatus, and/or a network service that receives, processes, or stores information about the device.

Methodology 200 also receives device inspector information at 206. Device inspector information can be received at 206 in various ways. In embodiments, the inspector can provide information such as logins, codes, passwords, identifiers (e.g., UIDs) or other information entered by the inspector. In alternative or complementary embodiments, biometric or physical information (e.g., fingerprint, retina scan, facial recognition, voice recognition) can be received related to the inspector. In still further embodiments, an inspector can possess an access card, key, fob, pendant, or other identifying component that, when operatively coupled with a device performing at least a portion of methodology 200, provides at least the inspector information for reception.

At 208, a determination is made as to whether the information provided at least at 204 and 206 is correct. The information received at 204 and 206 can be compared at 208 to one or more of local and remote information to verify the "identities" of the device and the inspector. If the information does not match or accord with the reference information stored to perform validation, a correction can be requested at 212, allowing new input related to one or more of the device information at 204 and/or inspector information at 206 to be received again for additional comparison. Alternatively, if the information received is not correct, methodology 200 can proceed to 214, where the methodology terminates after receiving incorrect information.

In addition to checking device information and inspector information separately, the interrogation of this information can be related at 208. For example, in addition to verifying that the inspector information is related to a known inspector, this information can also be compared to the device information to ensure the inspector is authorized to utilize or service the device (e.g., licensed in the location of the device). Alternatively, information provided can cascade to additional automated queries, such as confirming that the device was scheduled for inspection in advance, confirming the inspector possesses insurance, confirming that payment for the inspection has been arranged, and so forth.

If the information interrogated at 208 is correct, methodology 200 proceeds to 210 where the device and inspector information can be entered. In this way, non-verified information is not entered in a database. In embodiments, information entered can include further information, such as backflow preventer test results. However, in alternative embodiments, including embodiments where methodology 200 is a sub-routine of a larger testing methodology, at least a portion of received device and inspector information can be stored in a database related to the device and/or inspectors without additional information not gathered in the illustrated aspects. In an alternative embodiment, backflow preventer test results are a portion of the device information received at 204. After entering verified information at 210, methodology 200 ends at 214.

As discussed above, various structures alternative to those illustrated can be utilized without departing from the scope of the invention. For example, a different order of information reception (e.g., receive inspector information before receiving device information), additional received information (e.g., receive location information), additional or different interrogations of such information (e.g., check if device information is correct before receiving inspector information), and so forth, can be employed to accomplish results under methodology 200 and/or other methodologies herein.

Figure 3:
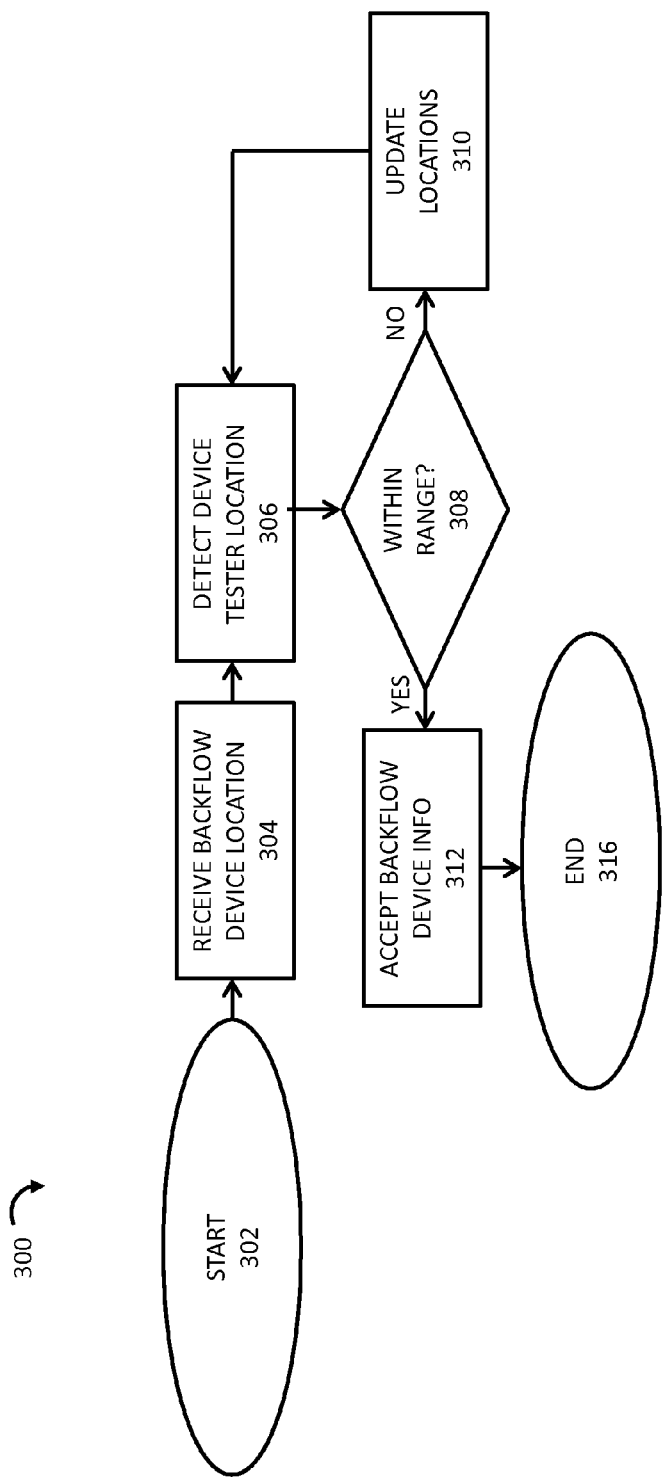
FIG. 3 illustrates an example methodology for confirming backflow preventer information based on location information.

FIG. 3 illustrates an example methodology 300 for confirming backflow preventer information based on location information. At 302, methodology 300 begins and proceeds to 304 where the location of a backflow preventer device is received or determined. In embodiments, a backflow preventer device's location is stored when it is installed, and 304 includes a query to a database to access the known backflow preventer device location. In alternative or complementary embodiments, a backflow device can be equipped with a location module that provides a location to another entity.

At 306, a backflow tester's location is detected. For example, an inspector, or inspection apparatus, can be located by GPS or other techniques. This detection can occur automatically or on-demand, and can be a discrete snapshot of a location or performed real-time as ongoing tracking.

At 308, the locations of the backflow tester and the backflow preventer device are compared to determine a distance between the two. A determination can be made at 308 regarding whether the backflow tester is within range of the backflow prevention device. In embodiments, "within range" can mean substantially close enough to the backflow preventer to service the preventer. For example, range thresholds can be 100 meters (e.g., on the same block), 10 meters (e.g., in the same building) or 1 meter (e.g., in the same room). Because interference from structures and other sources can interrupt high-accuracy location techniques (e.g., GPS readings within 10 meters), at least one embodiment can include a multi-factor location technique that compares or averages results from multiple location techniques, including location techniques that estimate movement from a previous known location after a location signal is degraded or lost. The determination can be stored as a variable, description, or other data portion (e.g., a tester location result).

In embodiments, multiple ranges can be utilized at 308, and additional actions can be completed in response. For example, when a tester is within 10 miles of a backflow preventer to be tested, a notification can be transmitted (e.g., to a customer or purveyor associated with the backflow preventer) to remind or indicate that the backflow preventer test will occur shortly. Specific to this example, calendar reminders, text messages, e-mail, phone calls, web-based updates, and other prompts or messages can be provided to a customer, inspector, purveyor, or administrator to facilitate access to the backflow preventer, ensure the test is performed, and inform the interested parties of performance and/or outcome.

If the tester is determined not to be within a predefined range of the backflow preventer device (e.g., beyond 50 meters from backflow preventer), methodology 300 can proceed to 310 where locations are updated or monitored to determine if and when the tester comes within range of the device.

If the tester is within range of the device at 308, methodology 300 proceeds to 312 where backflow device information is accepted based at least in part on the determination at 308. In this way, positive confirmation that a tester is at a backflow device can be accomplished prior to accepting information to a backflow preventer inspection network service or other database.

In embodiments, an additional determination (not pictured) can be made regarding the amount of time a tester spent within range of the backflow preventer device. In embodiments, a time window (e.g., 10 minutes) must pass during which the tester is within range of the backflow preventer device to discourage "drive-by" inspections or other workarounds to actual performance of the backflow preventer testing or service.

After information has been accepted at 312 while the tester is within range (or thereafter), methodology 300 can terminate at 316.

Figure 4:
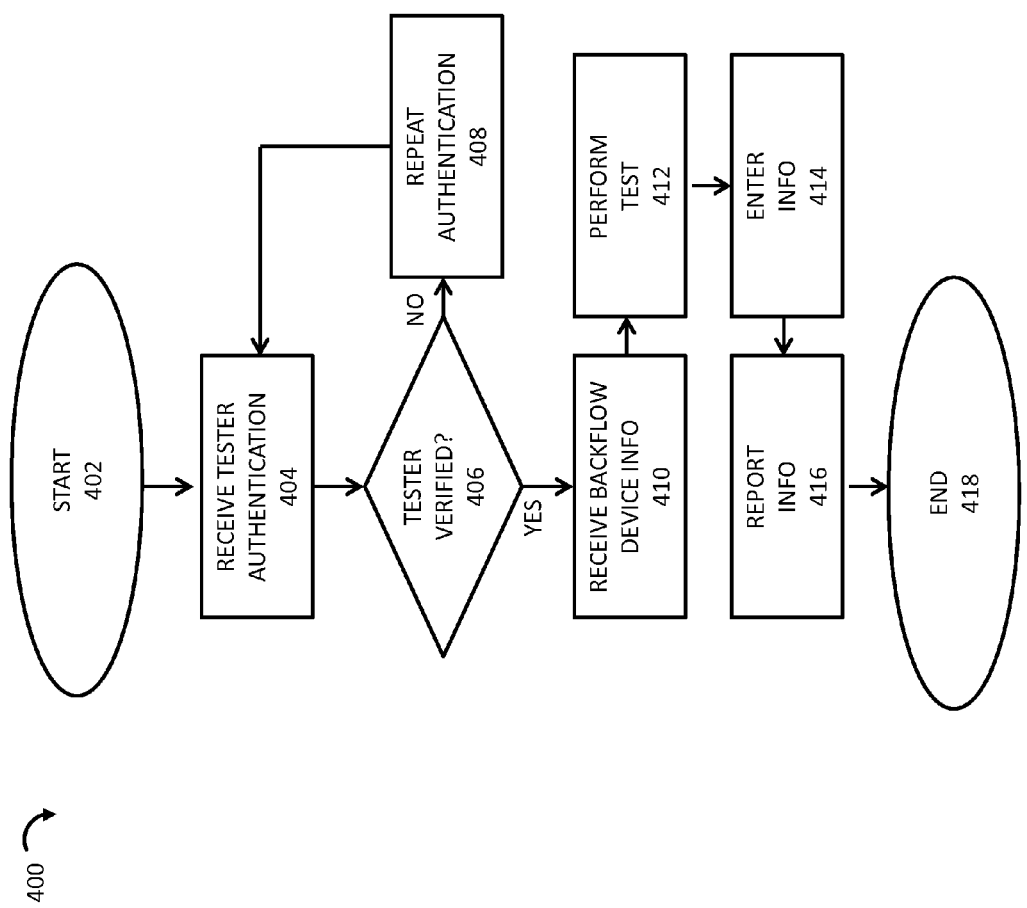
FIG. 4 illustrates an example methodology for authenticating a backflow tester.

FIG. 4 illustrates an example methodology 400 for authenticating a backflow tester. In embodiments, the tester to be authenticated can be a backflow preventer testing apparatus, a backflow preventer inspector, or both.

Methodology 400 starts at 402 and proceeds to receive tester authentication at 404. Tester authentication can include, for example, various information related to the inspector, a device used by the inspector, or combinations thereof. For example, a testing device can provide an associated inspector's fingerprint and the testing device serial number to verify the inspector and device prior to being granted permission to interact with a backflow preventer inspection network service. Alternatively, information related only to the inspector or only to the device can be provided at 404.

At 406, a determination is made regarding whether the information provided at 404 verifies the tester. For example, at 406, information provided at 404 can be compared to information stored locally (e.g., at a testing device) and/or remotely (e.g., over a network such as with a backflow preventer inspection network service) to determine whether the tester is known and/or authorized to perform backflow preventer service. The result of the determination at 406 can be stored as a variable, description, or other portion of data (e.g., tester authentication result).

If the determination at 406 does not verify the tester, methodology 400 can proceed to 408 where the authentication can be repeated, and methodology 400 thereafter recycles to 404.

If the determination at 406 returns positively verifying the tester, methodology 400 proceeds to 4109 where backflow preventer device information is received. Methodology 400 thus ensures that a tester is verified before interaction with a backflow preventer device is authorized. Reception of the backflow preventer device information at 410 can be used to positively identify a backflow preventer device.

In an embodiment where the backflow preventer device for which information is received at 410 is unknown to the testing apparatus, inspector, and/or backflow preventer inspection network service, the device information can be provided again, or a new record can be created for the identified backflow preventer device.

After tester verification at 406 and backflow preventer device information is received at 410, a backflow preventer test or inspection can be performed at 412. In embodiments, the backflow preventer test or inspection can be at least in part automated (e.g., connect testing apparatus and test is performed without further inspector interaction). The test can result in information about the status, function, performance, health, use, et cetera, of the backflow preventer. This information can be recorded and stored as data, in the form of an inspection result or test results.

Further, alternative or complementary embodiments can confirm that a backflow preventer inspection device is actually attached to a backflow preventer. In such embodiments, methodology 400 and/or the backflow inspection device can confirm that the inspection device is connected not just to any backflow preventer, but the desired backflow preventer. In addition, methodology 400 and/or the backflow inspection device can confirm that the connection is proper, and that the test is performed properly, both with respect to the type/model of backflow preventer and the pertinent regulations.

After testing of the backflow preventer is complete at 412, information including at least portions of the tester authentication, backflow device information, and results from the test can be entered into one or more local or remote databases. In an embodiment, the information is stored to a backflow preventer inspection network service.

Once the information related to the inspector, the backflow preventer, and the inspection is entered into one or more backflow preventer databases, at least a portion of the information can be reported to various entities. For example, administrators can be notified of failed or un-performed inspections to expedite action against noncompliant purveyors or customers. Alternatively, inspectors can be provided a risk level (e.g., high, medium, low, un-tested) for each backflow preventer. Purveyors and customers can be notified of inspections and results, and reports can include generation of reminders or future correspondence based on when inspections are due or when they were last performed. Inspectors can receive reports to assist with management of companies with which the inspectors are involved, invoicing, for their own records, and so forth. Various embodiments embrace the use of aggregated reports or historical reports related to one or more backflow preventer devices, customers, purveyors, inspectors, and so forth. In embodiments, there can be multiple administrators, and a higher administrator (e.g., state) can access reports related to one or more lower administrators (e.g., municipalities).

It is understood that various other reporting functions can be enabled using techniques herein, and that reported information need not be a single document. Notifications can interact with, for example, computer applications and produce notifications or schedule future activities such as reminders, notifications, additional inspections, bills or payments, and so forth.

Figure 5:
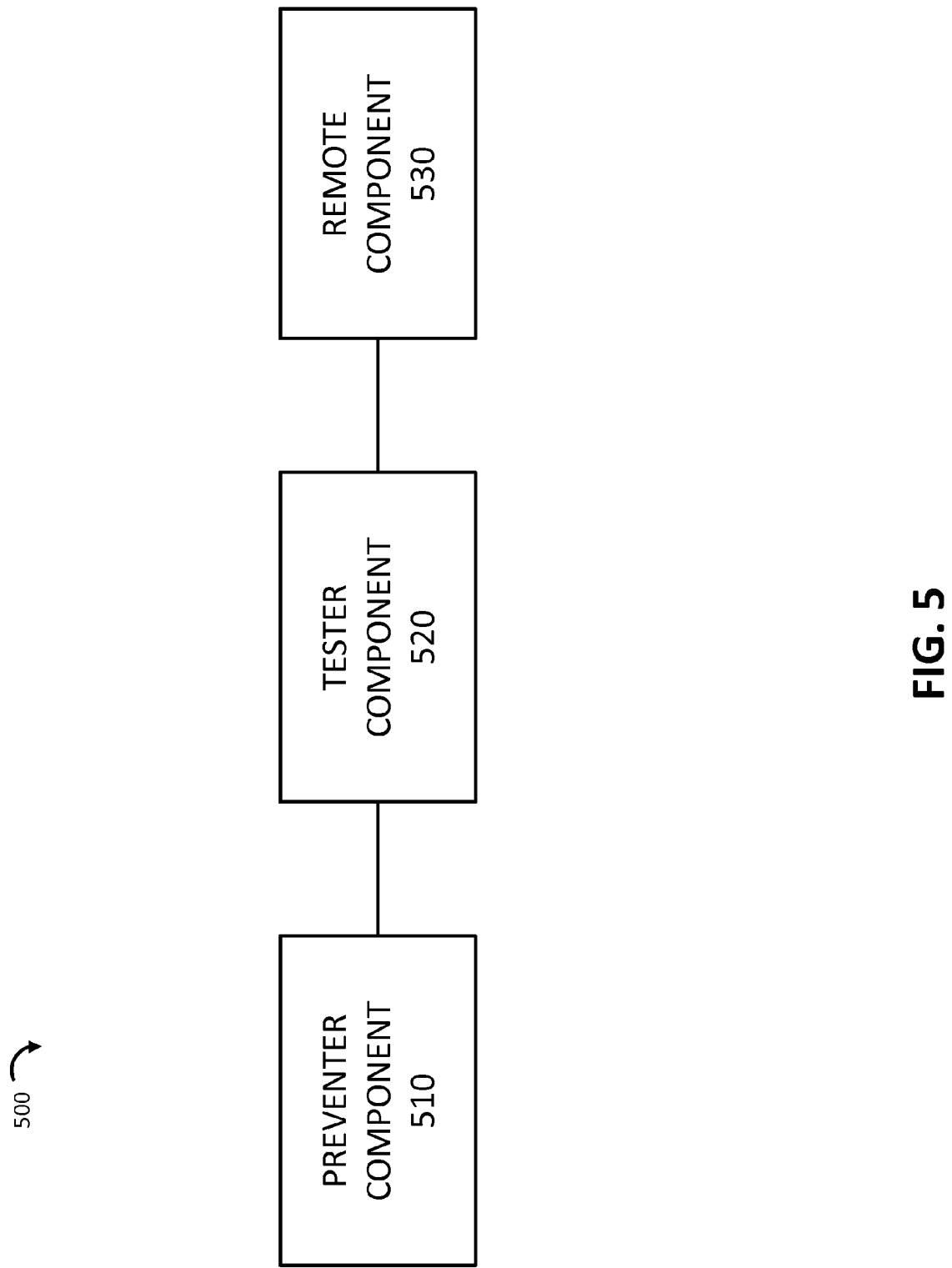
FIG. 5 illustrates an example block diagram of components of a system for tracking backflow preventer testing.

FIG. 5 illustrates an example block diagram of components of a system 500 for tracking backflow preventer testing. System 500 includes at least preventer component 510, tester component 520, and server 630.

Preventer component 510 can include a backflow preventer. The backflow preventer can be uniquely identified as described herein, and include various interfaces (e.g., physical hose connections) for testing the backflow preventer.

In embodiments, preventer component 510 can be a "smart" backflow preventer and include communication or electronic subcomponents. For example, a smart backflow preventer can include (but is not limited to) a GPS module, a wired or wireless communication port, and sensors designed to identify the connection of testing devices, stresses or failure of various components (e.g., a valve), and/or other information of interest. In embodiments, a smart backflow preventer can include storage means for storing information related to itself (e.g., inspection history, service history, location information), inspectors or technicians who service the backflow preventer, an associated purveyor, an associated customer, an associated administrator, and so forth.

Tester component 520 can operatively couple with preventer component 510 to identify and test preventer component 510. In an embodiment, tester component 520 includes one more of a barcode reader, quick response (QR) code reader, camera, RFID reader, and/or various user interfaces (e.g., keyboard, pointing device, touch screen) to accept a UID related to at least preventer component 510.

Tester component 520 can also include one or more aspects used in backflow preventer testing or inspection apparatuses. For example, tester component 520 can include a plurality of physical connections or interfaces such as test cocks (e.g., high side, low side), valves (e.g., bleed valves), bypasses, vents, adaptors, et cetera, as found in backflow preventer test kits.

Finally, tester component 520 can include aspects related to data reception, storage, and transmission. Tester component 520 can store information related to an identified backflow preventer and test results related thereto, and transmit this material using wired or wireless communications to provide this information to a database (e.g., associated with a backflow preventer inspection network service).

Figure 6:
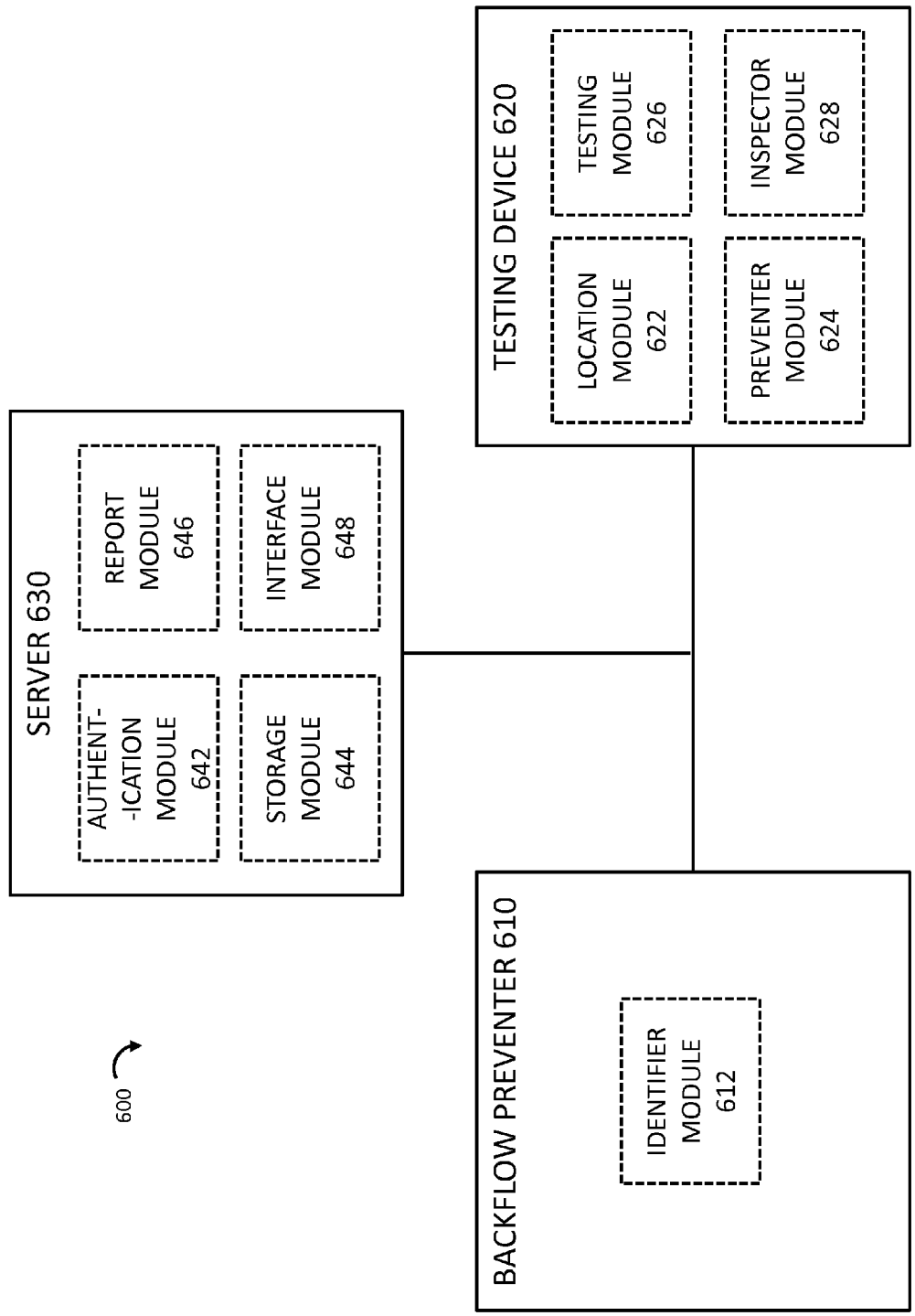
FIG. 6 illustrates an example block diagram of components of a service for tracking backflow preventer testing.

FIG. 6 illustrates an example block diagram of components of a service 600 for tracking backflow preventer testing. In embodiments, at least a portion of service 600 is a program hosted on server 630. It will be understood that server 630 need not be a single server or single physical entity, but can be implemented distributed across a plurality of local and remote devices.

Server 630 can include at least authentication module 642, storage module 644, report module 646, and interface module 648. Authentication module 642 can be used to authenticate or verify the identity and/or credentials of at least testing device 620. In embodiments, part of identifying testing device 620 includes identifying the user or inspector of testing device 620. In additional or complementary embodiments, backflow preventer 610 can be identified at least by authentication module 642. Authentication module 642 can control or limit access to one or more modules or other aspects of server 630 based on the authentication(s).

Authentication module 642 can store information required to authenticate testing device 620, its user, and/or backflow preventer 610. In alternative or complementary embodiments, authentication module 642 interacts with storage module 644 to recall and store authentication information as needed based on information provided from at least testing device 620.

Storage module 644 can include computer readable instructions and formatted data for effecting at least a portion of a backflow preventer inspection network service. The computer readable instructions can be executed locally, at testing device 620 or another device, or combinations thereof. The formatted data can include a database including information related to backflow preventers, customers, purveyors, inspectors, and administrators. In embodiments, the other modules of server 630, or computer executable instructions associated therewith, can be stored at least in part in storage module 644.

Report module 646 interacts with at least storage module 644 to generate reports. Reports can include information related to one or more backflow preventers, customers, purveyors, inspectors, and/or administrators. Further, report module 646 can generate and transmit correspondence between entities, such as reminders, shut-off orders, calendar appointments, inter-entity messages, and so forth. In embodiments, server 630 can be in communication with one or more financial entities, and report module 646 can send or receive bills, fines, payments, and so forth.

Interface module 648 includes at least one or more interfaces designed to facilitate interaction with machines or humans via at least testing device 620. In embodiments, interface module 648 is configured to send and receive information to and from testing device 620. Further, interface module 648 can be secured by authentication module 642. Alternatively, at least a portion of interface module 648 can be accessible to facilitate access to (or independent of) authentication module 642.

Server 630 is in communication, at least at a point in time, with testing device 620. Testing device 620 includes at least location module 622, preventer module 624, testing module 626, and inspector module 628.

Location module 622 can be a module that tracks the location of at least testing device 620. For example, techniques employing GPS, signal strengths from various wireless network cells, and others can be effected by location module 622. In at least one embodiment, a user can manually provide a location. Location module 622 can store one or more detected or provided locations, and transmit the location information to at least server 630. In embodiments, a location from location module 622 can be compared to the location of backflow preventer 610.

Preventer module 624 can be configured to identify backflow preventer 610. For example, preventer module 624 can include an RFID scanner, barcode scanner, QR reader, network interface, camera, user input portion, and others.

Testing module 626 can manage backflow preventer testing and results. In embodiments, testing module 626 detects the connection of testing device 620 to backflow preventer 610. In embodiments, testing module 626 can perform and record the results of the test in addition to confirming the test. Testing module 626 can further determine testing procedures and related regulations, and execute or display a guide to facilitate execution of proper testing based at least in part on one or more of the identified backflow preventer 610 and a location from location module 622. In embodiments, testing module 626 can also receive manually input testing information through a user input (not pictured) of testing device 620. Testing module 626 forwards one or more portions of such information to server 630 for storage in accordance with the procedures of server 630 (e.g., to validate the data before it is accepted).

Inspector module 628 identifies or validates an inspector utilizing testing device 620. In embodiments, inspector module 628 can receive input from the inspector in the form of user names, passwords, personal identification numbers (PINs), UIDs, or other codes. In alternative or complementary embodiments, inspector module 628 can receive input related to biometric data or physical characteristics of a user, such as a fingerprint, retina scan, other image, sound, et cetera. These inputs can be interrogated locally at testing device 620 or transmitted to server 630 for review to determine whether an inspector is authenticated.

Finally, backflow preventer 610 includes identifier module 612. Identifier module 612 can include, but is not limited to, one or more of a serial number, barcode, QR code, RFID tag, UID network interface, high-accuracy geographic location (e.g., location accurate to degree with less variability than size of unit, location sufficiently accurate to distinguish from nearest next unit), and others. Identifier module 612 allows for substantially unique identification of backflow preventer 610 to increase the confidence in the testing of individual backflow preventers, compliance of parties involved, scheduling of future testing, and historical inspection and service information.

Figure 7:
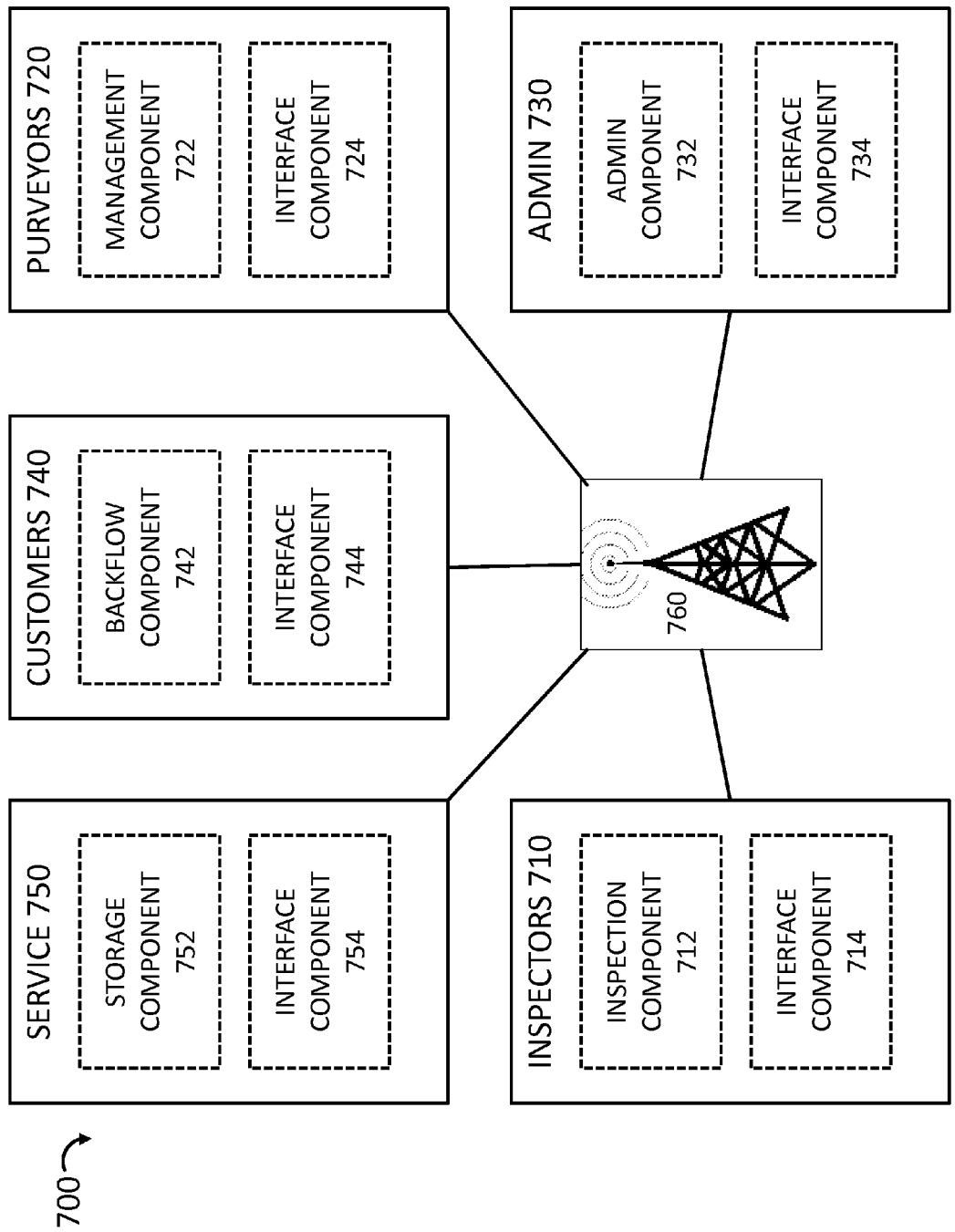
FIG. 7 illustrates another example block diagram of a system 700 for tracking backflow preventer testing.

FIG. 7 illustrates another example block diagram of a system 700 for tracking backflow preventer testing. System 700 illustrates the parties involved in a backflow prevention and various system components associated with each. Further, system 700 illustrates communication via at least networks 760, allowing the entities and their associated components to exchange information. Networks 760 can be wired, wireless, or combinations thereof.

Inspectors 710 are provided inspection component 712 and interface component 714. Inspection component 712 can include a backflow preventer inspection kit or device as described herein, and interface component 714 can provide access to at least a portion of information available via service 750. Further, a device associated with 710 (which can, but need not, be inspection component 712) provides information to service 750 via interface component 714.

Purveyors 720 are provided management component 722 and interface component 724. Management component 722 can receive, process, and manage schedules and reports related to backflow preventers coupled with the purveyor's water system. In embodiments, management component 722 can be used to generate and transmit electronic or physical notifications to at least customers. In alternative or complementary embodiments, management component 722 can provide an instruction for automatic or manual execution to shut off or turn on water or access to water via conduits in fluid communication with one or more backflow preventers.

In embodiments, purveyors 720 can add or edit information related to backflow preventers related to their resource network using interface component 724. For example, a purveyor can update information (e.g., accessible via a backflow preventer inspection network service) related to whether a customer has received a notification, whether water is turned on or off, and so forth. Purveyors can also view at least a portion of information stored related to backflow preventers in their control or controlled by their customers.

Administrators 730 can be provided administration component 732 and interface component 734. Interface component 734 can be used to view information related to at least backflow preventers, customers, purveyors, and inspectors under the administrative authority of administrators 730. In embodiments, administration component 732 can be used to provide notifications to parties under the authority of administrators 730. In additional or complementary embodiments, administration component 732 can issue orders or fines, grant or revoke licenses, modify regulations or approved backflow preventers, and update such information at service 750.

Customers 740 can be provided backflow component 742. In embodiments, backflow component 742 can be a backflow preventer and any associated components (e.g., identifier chip). Interface component 744 can permit customers 740 to view information related to at least backflow preventers related to customer 740's water service through service 750.

Service 750 can include storage component 752 and interface component 754. Storage component 752 can include data related to administration of backflow preventer management, and more generally water service management or management of other utilities. Aspects of at least one database within storage component 752 can be seen in FIG. 8. Interface component 754 can provide a combination of read, write, and execute permissions for a party associated with service 750. In embodiments interface component 754 can further interact with other interface components of system 700 to provide information from service 750 to other actors in system 700.

Figure 8:
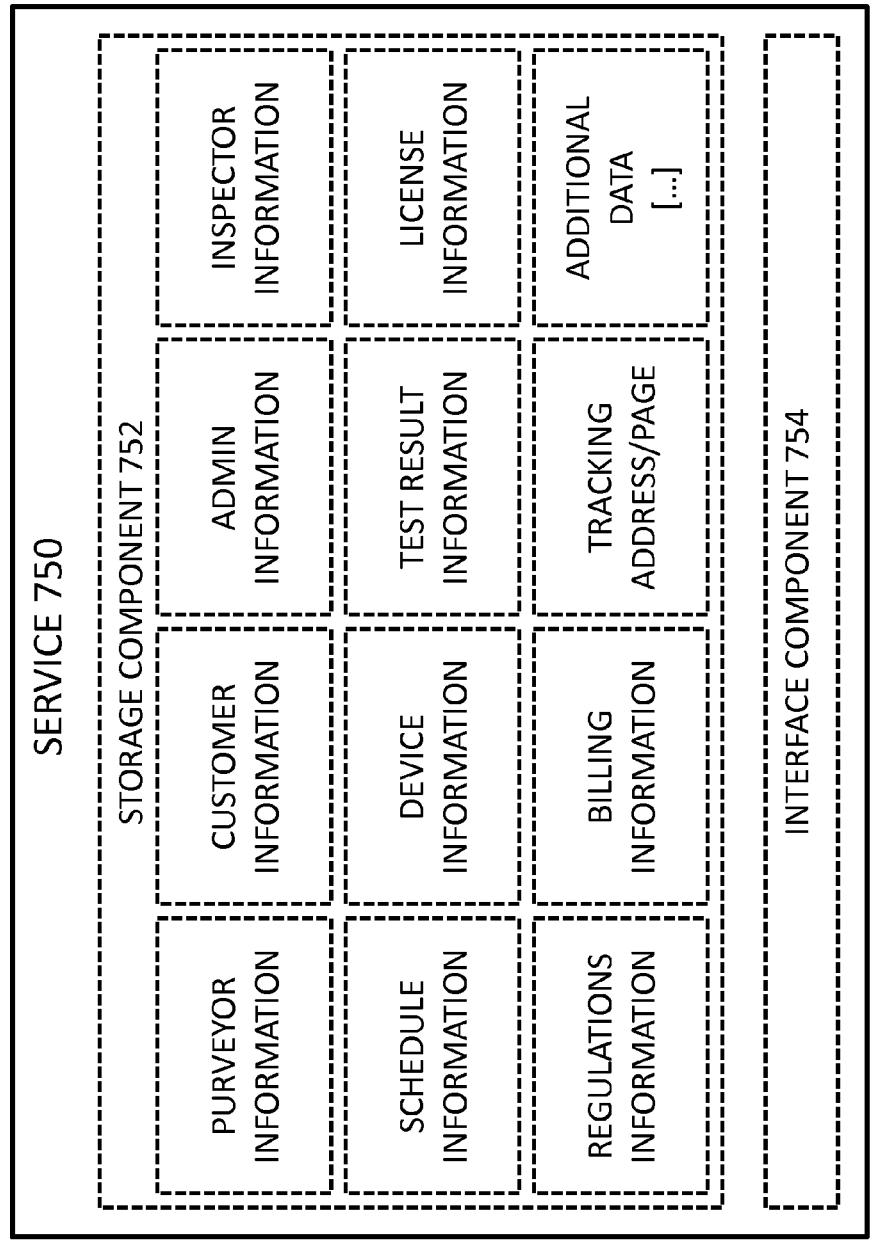
FIG. 8 illustrates an example block diagram of storage component used in conjunction with a service 750 for tracking backflow preventer testing information and other data.

As noted, FIG. 8 illustrates an example block diagram of storage component 752 used in conjunction with a service 750 for tracking backflow preventer testing information and other data. Data stored in storage component 752 can include device information related to backflow preventers, as well as device information related to testing devices or other devices that interface within system 700. Device information can include manufacturer, model, and functions; UIDs, information coded in barcodes, RFIDs, QR codes, serial numbers, tracking numbers, tracking addresses on a network; location information; installation date; contact information of parties associated with the device; test results of a backflow preventer; test results related to testing or calibration of a backflow preventer testing kit or apparatus; historical test results; historical record of degree of hazard related to a backflow preventer (e.g., high, medium, low, unknown); service history of the devices including repair parts; shut-off history related to a backflow device; aggregated reports relating to data of about one or more backflow preventers; and others.

Further information retained in storage component 752 can include information directed to parties (e.g., customer, purveyor, inspector, administrator). Party information can include schedules or calendars, notification histories, reports on a party (e.g., by-purveyor backflow preventer statistic report); access attempts, access failures, and edit history; locations, contact information (e.g., phone, address, e-mail), associated individuals, business name, associated entities; insurance and bond information; billing and payment information; identifiers such as driver's license number(s), social security number(s), UID(s); and others. Information particular to inspectors can include license information, education information, license expiration, renewal information, infraction or disciplinary information, location information, location history (e.g., tracks), location by-time, associated testing devices, and others. Fee structures (e.g., annual, per test, set-up, shut-off, restoration), contracts (including information about who is responsible for installation and maintenance of the backflow preventer), calendars and schedules can also be included.

Regulations can be stored at storage component 752. For example, information about allowable devices, testing regularity, testing procedures, and others can be included.

Information related to access to storage component 752 can also be stored at storage component 752. For example, storage component 752 can store credentials or permissions related to one or more other portions of data used to grant or deny access to such data for one or more customers, inspectors, purveyors, administrators, or third parties involved with service 750.

While storage component 752 is shown as a single component, it is understood that various embodiments can allow for this and other information to be distributed or located remotely for query over two or more storage components. For example, license information can be queried from a separately maintained database. Further, while various functional categories are described, it is understood that additional or supplemental data may be included, and that particular portions of data may be included in two or more categories or groups. Further, aspects of such data or storage can be omitted where appropriate without departing from the scope or spirit of the innovation. While only particular categories are pictured in FIG. 7, the particular aspects illustrated will not limit other aspects described in this disclosure.

Figure 9:
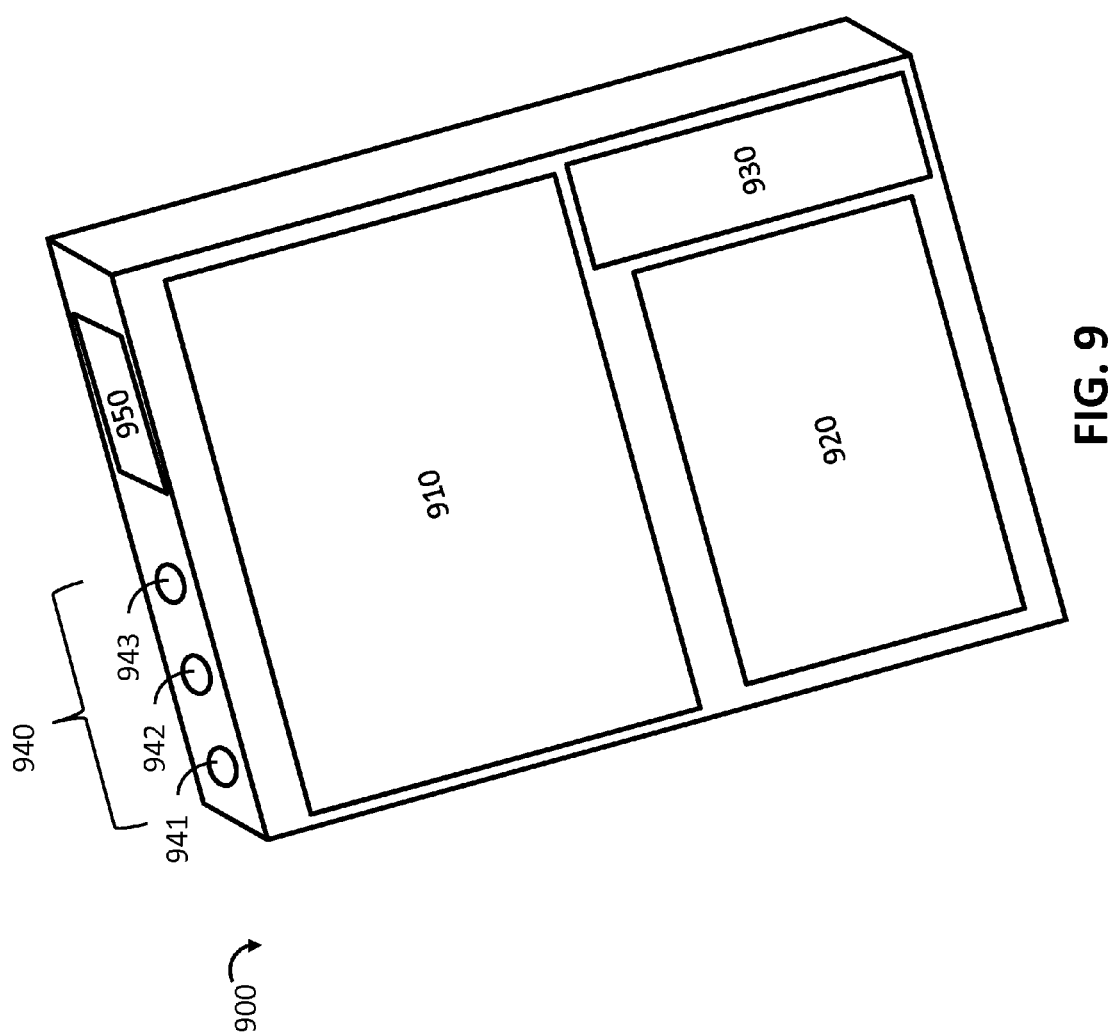
FIG. 9 illustrates a device used in conjunction with backflow preventer testing.

Turning now to FIG. 9, illustrated is a device 900 used in conjunction with backflow preventer testing. Device 900 can include display 910, user interface 920, user identifier 930, backflow preventer identifier 950, and backflow preventer testing nodes 941-943. Display 910 can provide real-time or stored (e.g., local or remote) data to an entity viewing display 910. User interface 920 can permit an entity using device 900 to enter information into device 900, while user identifier 930 can be a specific input component for identifying an entity using device 900 (e.g., fingerprint reader, retina scanner, microphone, camera). In embodiments, display 910, user interface 920, and user identifier 930 can be combined into a touch-screen or similar interface.

Backflow preventer identifier 950 can be an RFID detector, barcode scanner, QR reader, camera, or other component capable of receiving information to identify a backflow preventer. In embodiments, user interface 920 can supplement or replace backflow preventer identifier 950 (e.g., where user enters serial number or unique inspection code).

While three testing nodes 941-943 are illustrated, it is understood that greater or fewer may be present as needed to conduct inspection of one or more backflow preventers. In embodiments, device 900 can detect proper attachment between one or more of testing nodes 941-943 and a backflow preventer to be tested. A determination or detection regarding attachment of a testing apparatus can be recorded or stored as a variable, description, or other data portion (e.g., attachment result).

Device 900 can provide various prompts and guidance to a user. For example, regulations can be displayed, as can instructions for how to test one or more identified backflow preventers. Manuals and parts lists for an identified backflow preventer can also be located and displayed. Device 900 can include a location module (e.g., GPS) that can guide a user to a backflow preventer, as well as transmit notifications based on location (e.g., reminder to customer that inspector will be listening upon traveling to backflow preventer, notification to purveyor and administrator if backflow preventer passed inspection). An integrated messaging system leveraging one or more of Wi-Fi, cellular networks, wired networks, device-to-device connections, and other methods of sharing data can be employed with device 900.

In embodiments, device 900 can self-calibrate. In alternative or complementary embodiments, device 900 can provide a local or remote notification when it is out of calibration or damaged.

As used herein, "software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules, components or programs including separate applications or code from dynamically linked libraries.

The terms "module" and "component" as used herein can be defined as a portion of hardware, a portion of software, or a combination thereof. A portion of hardware can include at least a processor and a portion of a memory, wherein the memory includes computer executable instructions. Software may be implemented in various forms such as a stand-alone program, a function call, a servlet, an applet, an application, instructions stored in a memory, part of an operating system or other type of executable instructions. "Computer", "processor", "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk. "Computer memory", as used herein, refers to a storage device configured to store digital data or information which can be retrieved by a computer or processing element. "Controller", as used herein, refers to the logic circuitry and/or processing elements and associated software or program involved in controlling a device. The terms "signal", "data", and "information" may be used interchangeably herein and may refer to digital or analog forms.

While principles and modes of operation have been explained and illustrated with regard to particular embodiments, it must be understood, however, that this may be practiced otherwise than as specifically explained and illustrated without departing from its spirit or scope.

What is claimed is:

1. A method for testing a backflow preventer, comprising:
   authenticating a tester to produce a tester authentication result;
   identifying a backflow preventer using a unique backflow preventer identifier;
   recording at least an inspection result of testing of the backflow preventer;
   communicating at least the inspection result to a server based at least in part on one or more of the tester authentication result and the unique backflow preventer identifier.

2. The method of claim 1, further comprising:
   determining a backflow preventer location;
   determining a tester location; and
   confirming a tester is located within a range of the backflow preventer location to produce a tester location result,
   wherein communicating at least the inspection result to a server is further based at least in part on the tester location result.

3. The method of claim 1, further comprising detecting attachment to the backflow preventer of a testing apparatus associated with the tester to produce an attachment result, wherein communicating at least the inspection result to a server is further based at least in part on the attachment result.

4. The method of claim 1, further comprising generating a report using at least the inspection result.

5. The method of claim 4, further comprising transmitting the report to a third party.

6. The method of claim 1, wherein the tester authentication result is produced using one or more of a fingerprint, a retina scan, voice recognition, and facial recognition.

7. The method of claim 1, wherein the unique backflow preventer identifier is a serial number.

8. The method of claim 1, wherein the unique backflow preventer identifier is coded in one or more of a barcode, a QR code, and an RFID tag.

9. The method of claim 1, further comprising performing the testing of the backflow preventer.

10. The method of claim 1, wherein the tester authentication result is transmitted to the server.

11. A system for testing a backflow preventer, comprising:
a backflow preventer authentication module that identifies the backflow preventer according to a backflow preventer identifier;
an inspector authentication module that identifies an inspector according to at least an inspector identifier;
a testing module that receives at least a portion of test results of one or more tests performed on the backflow preventer based at least in part on one or more of the backflow identifier and the inspector identifier; and
a communications module that transmits the test results to a backflow compliance server.

12. The system of claim 11, further comprising a location module that determines an inspector location of an inspector in relation to a backflow preventer.

13. The system of claim 12, further comprising a notification module, wherein the notification module produces a notification to a third party based at least in part on the inspector location.

14. The system of claim 11, further comprising a notification module, wherein the notification module produces a notification to a third party based at least in part on the test results.

15. The system of claim 11, further comprising a data validation module, wherein the data validation module modifies at least the test results based on at least one of the backflow preventer identifier and the inspector identifier.

16. A mobile device for testing a backflow preventer, comprising:
a backflow preventer recognition component configured to recognize a backflow preventer according to a backflow preventer identifier;
an operator recognition component configured to recognize an operator of the device according to one or more operator criteria;
a test result component configured to receive at least one test result related to the backflow preventer; and
a network component configured to communicate the at least one test result, the one or more operator criteria, and the backflow preventer identifier.

17. The mobile device of claim 16, further comprising a permission component, wherein the permission component authorizes the network component to write to a backflow preventer record dependent on an approval, the approval is based on at least the backflow preventer identifier and the one or more operator criteria.

18. The mobile device of claim 17, further comprising a location component, wherein the location component is configured to identify a location of the mobile device.

19. The mobile device of claim 18, wherein the approval is further based on the device being within a threshold distance of the backflow preventer.

20. The mobile device of claim 18, further comprising a notification component, wherein the notification component transmits a notification to at least one of a customer, a purveyor, and an administrator based at least in part on the location of the mobile device.

* * * * *